Patented Mar. 16, 1926.

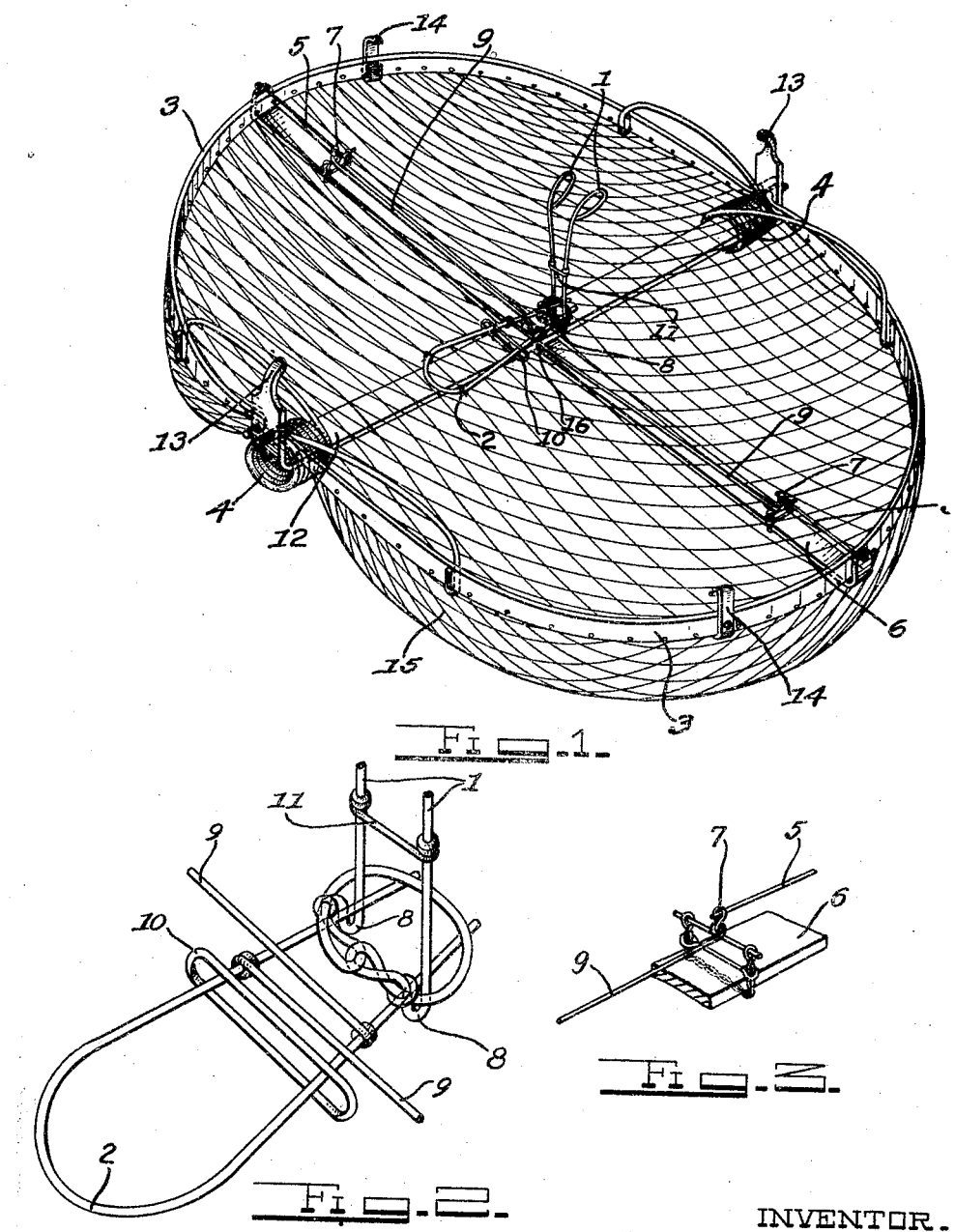

1,576,707

UNITED STATES PATENT OFFICE.

VERNON BAILEY, OF WASHINGTON, DISTRICT OF COLUMBIA, ASSIGNOR TO GOVERNMENT AND PEOPLE OF THE UNITED STATES.

ANIMAL TRAP.

Application filed December 17, 1925. Serial No. 76,125.

(GRANTED UNDER THE ACT OF MARCH 3, 1883; 22 STAT. L. 625.)

*To all whom it may concern:*

Be it known that I, VERNON BAILEY, a citizen of the United States of America, and an employee of the Department of Agriculture of the United States of America, residing at Washington, District of Columbia, have invented a new and useful Animal Trap, of which the following is a specification.

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

The drawings are in three figures of which Fig. 1 shows the entire trap in an open position ready to be sprung. Fig. 2 shows a detailed view of the trigger and trigger spring with cross wires attached. Fig. 3 shows a cross wire attached to the loop which holds down the trigger bar.

The important features of the trap are the trigger 1 and trigger spring 2, by which both of the wide wire-mesh wings or jaws 3 of the trap are adapted to be released at the same instant to close and lock around and above the entrapped animal.

The wide semicircular jaws 3 are propelled by two powerful coil springs 4, one at each end of the trap, which are compressed when the trap is opened and held in tension by side bars 5 attached to the ends of the main cross bar 6 of the trap, the free end of each of these side bars 5 being held down by hinged loops 7 fastened to the cross bars 6.

The double wire trigger 1 stands erect in the center of the trap, and with two short side loops 8 below its circular base, holds near together the two arms of a hairpin spring 2 to which a cross wire 9 is attached to each arm just back of the trigger. When the trigger is moved in any direction by the touch of the body of a swimming animal, it tips over and releases the sides of the hairpin spring 2, which in opening jerks the loops 7 from the free ends of the side bars 5 and releases both trap jaws 3 simultaneously. A loop 10 keeps this spring 2 from opening too far. The trigger may be provided with a cross wire or brace 11 below the middle to stiffen the sides and quicken its response to side pressure.

The trap jaws are propelled by powerful coil springs 4, encircling the base bar 12 near each end and clasping the trap jaws 3 from opposite sides. The jaws 3 in closing meet evenly at the top and are prevented from going past the center by strong intruding flanges 13 at the tips of the longitudinal base bar 12 against which they strike. When closed the jaws 3 are securely held together by two flat hooks 14 attached loosely to the opposite jaws and passing over and dropping down when the trap jaws close.

The woven wire mesh 15 of the bottom and sides of the trap is securely linked to holes in the outer edges of the flat steel jaws 3, so that when closed the trap has no opening of more than an inch in diameter.

The cross bar 6 and longitudinal bar 12 are bolted together in the center by means of a bolt 16; the cross bar 6 is below the longitudinal bar 12, so the bolt 16 can be loosened and the cross bar 6 turned longitudinally for convenience in carrying or shipping the trap. When turned back at right angles in position for setting the trap the bolt 16 can be tightened to hold it in place and the trigger wires 9 slipped over the trigger loops 7 when the trap is ready for setting.

From the foregoing description and drawings it will be seen that the trigger action of this trap, with erect arms of trigger responding to slight pressure from any side and releasing the trigger spring which in turn simultaneously releases the jaws from both sides, is unique and an important invention in trap mechanism.

I claim:

In an animal trap, a base, a trigger supported by said base and comprising two vertical rods, a cross brace for said rods, loops attached to the base of said rods, a hairpin spring encircled by said loops, cross wires extending from the sides of said spring to the jaws of the trap, said cross wires being provided with latch members adapted to normally hold the jaws in their inactive positions, and coiled springs supported on said base and engaging the jaws for normally urging the jaws toward each other.

VERNON BAILEY.